Dec. 8, 1931.  R. E. KOLBE  1,835,881

METHOD OF AND APPARATUS FOR FREEZING MATERIALS

Filed Dec. 31, 1928  2 Sheets-Sheet 1

Inventor:
Robert E. Kolbe,
by Walter E. Lombard.
Atty.

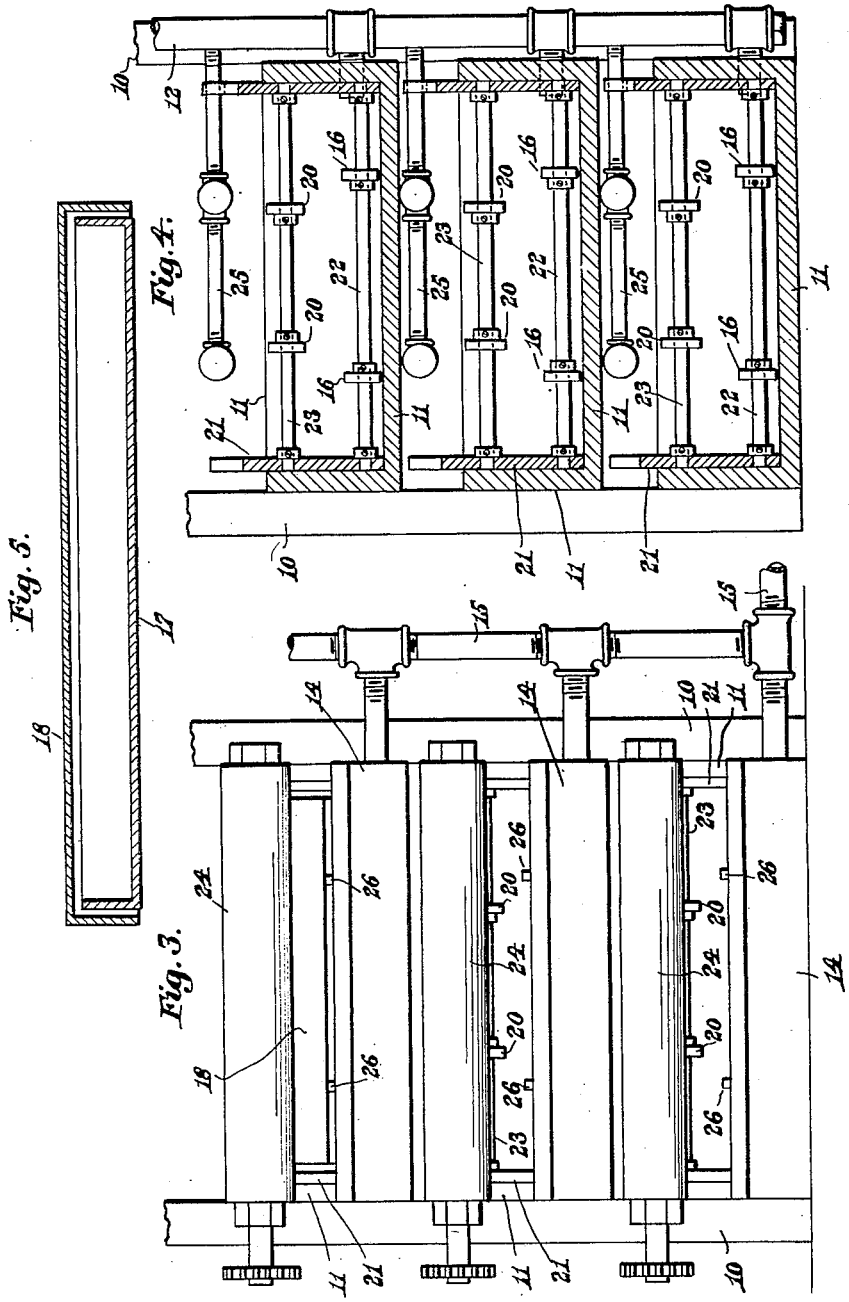

Patented Dec. 8, 1931

1,835,881

UNITED STATES PATENT OFFICE

ROBERT E. KOLBE, OF ERIE, PENNSYLVANIA

METHOD OF AND APPARATUS FOR FREEZING MATERIALS

Application filed December 31, 1928. Serial No. 329,369.

This invention relates to apparatus for and method of freezing materials such as fish, meats and the like, whereby such materials may be quickly frozen and the object of the invention is to provide means of a simple character for attaining this result.

This desired object is obtained by the mechanism illustrated in the accompanying drawings.

In one aspect the present invention consists in a further development or carrying forward of the invention disclosed in my earlier Patent No. 1,641,441, in accordance with which the materials to be frozen are enclosed in buoyant receptacles and these allowed to float from one end to the other of an elongated tank of refrigerated brine. I now propose to improve the design and efficiency of such apparatus in several respects. In the first place, it is proposed to provide a series of elongated tanks or troughs disposed in parallel relation one above another and all arranged to be supplied with refrigerated brine by a single circulating system. Such construction is not only compact and economical of floor space but convenient for feeding and for the removal of the treated product. The product is placed in containers and, instead of allowing these to float at indeterminate levels, it is now proposed to provide guiding means within each tank which controls the depth of submergence of the containers independently of their buoyancy. It is also proposed to provide mechanical means for advancing the containers in the tank and this provision permits the containers to be moved against the current of the brine, if desired, and so increases the efficiency of refrigeration. Further, it is proposed to equip the tanks with an overhead spray system whereby the freezing effect of the brine in the tanks is supplemented by the application of a refrigerated spray to the unsubmerged portions of the containers.

These and other features of the invention will be best understood and appreciated from the following description of a preferred embodiment thereof, selected for purposes of illustration and shown in the accompanying drawings, in which—

Figure 3 represents an end elevation of same.

Figure 4 represents a transverse vertical section of same, and

Figure 5 represents a vertical section of one of the pans and the cover therefor.

Similar characters indicate like parts throughout the several figures of the drawings.

Figure 1:
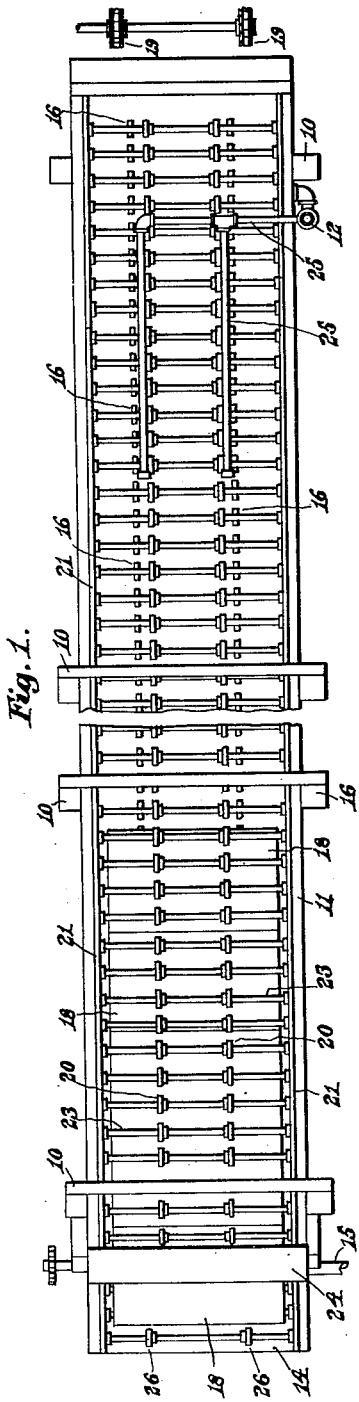
Figure 1 represents a plan of an apparatus embodying the principles of the present invention.
Figure 2:
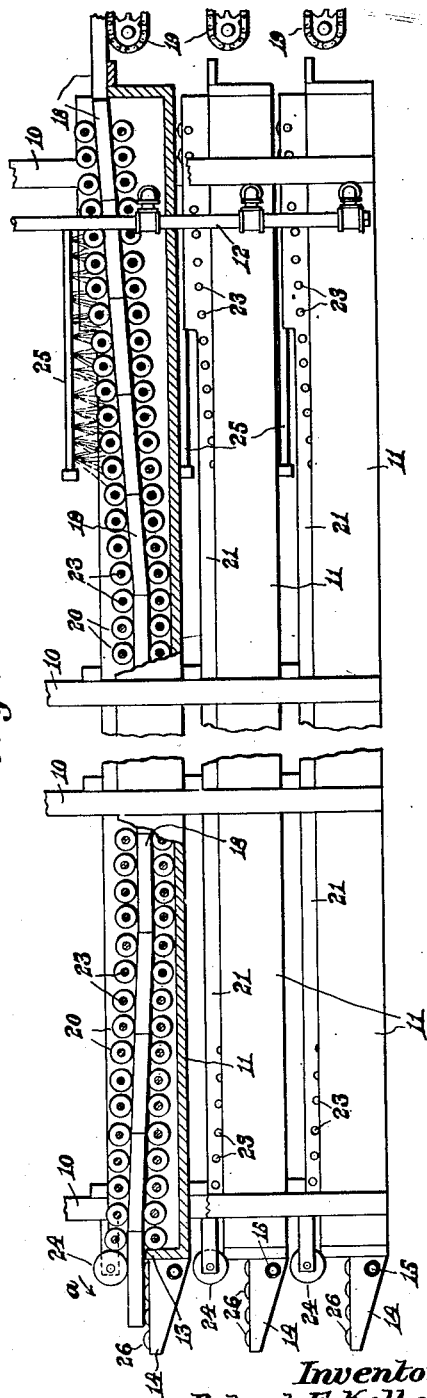
Figure 2 represents a side elevation of same with portions of the tanks shown in section.

In the drawings, 10 is a framework having mounted thereon a plurality of shallow tanks or troughs 11 open at the top and arranged in parallel relation, one above another.

A pipe 12 is adapted to deliver to one end of these tanks 11 a liquid freezing medium such as brine.

The opposite end wall of each tank 11 is lower than the wall at the inlet end forming a dam 13 over which the freezing medium flows into sumps 14 from which it is discharged into the pipe 15 through which it passes to any suitable receptacle.

The freezing medium will continuously flow toward the sump 14 and the speed of flow may be varied as desired.

The temperature of the freezing medium must always be lower than the freezing point of the material to be frozen.

Within each tank 11 are a plurality of supporting and guiding rollers 16 on which the pans 17 are adapted to be moved lengthwise of the tanks in a direction opposite to the flow of the freezing medium.

These pans 17 are preferably provided with covers 18 of such size as to leave slight clearance between the pans 17 and covers 18.

The material to be frozen is placed within the pans 17 and the covers pressed downwardly on the material contained within said pans.

The air trapped within the covered pans 17, 18 prevents the freezing medium entering the covered pans and coming into contact with the material contained therein even when the pans are wholly submerged in said medium.

The rollers 16 at each end of the tank 11 are disposed in inclined planes, so that when the pans 17 are pushed into one end of said tanks they will move downwardly until the bottoms thereof are submerged in the freezing medium and subsequently when they reach the opposite end of the tanks said pans will move upwardly over the end of the tanks to endless conveyors 19 to be carried away to any desired point.

If the pans and contents thereof are sufficiently heavy, they will remain in contact with these rollers 16 during their passage through the freezing medium but when of light weight the pans would have a tendency to float.

To obviate this a second set of rollers 20 are disposed above the other set of supporting rollers 16, the two sets of rollers being parallel.

The pans 17 and their covers 18 move between these two sets of rollers, the upper set preventing any upward movement thereof due to the buoyance thereof.

The rollers 16, 20 may be mounted within the tanks 11 in any well known manner, one way as illustrated in the drawings consisting of a frame 21 having revolubly mounted in bearings therein the shafts 22, 23 to which the rollers 16, 20 are respectively secured.

This frame 21 is disposed within the troughs or tanks 11.

At the feeding end of the tanks 11 is disposed a revoluble rubber covered drum 24 which may be driven in the direction of arrow *a* by any suitable means.

This drum periphery contacts with the upper face of the covers 18 of pans 17 and when in operation positively forces the covered pans into the tanks between the two sets of rollers each pan fed into the tank pushing forward the other pans in advance thereof.

Near the delivery end of each tank and above the same is a spray pipe 25 connected to the inlet pipe 12 and adapted to deliver sprays of the freezing medium upon the tops of the covers 18 as the pans 17 are being discharged from the tanks 11.

Revolubly mounted at the top of each sump 14 are a plurality of rollers 26 forming a support for the pans 17 preparatory to feeding said pans into the tanks 11.

In carrying out this improved method of freezing material, pans 17 containing material to be frozen are fed into the upper tank 11 until said tank is filled and then the rotation of the rubber drum 24 is stopped and the next tank is filled and its drum 24 stopped from further rotation.

The operation is repeated for each tank in the stack until all of the tanks are filled with pans.

By this time the material in the pans in the upper tank will be properly frozen and its drum 24 will then be rotated again to feed into the tank a new supply of pans, the pans first disposed in said tank being pushed from the other end of the tank onto the endless conveyor 19.

The drum 24 is then stopped and the same operation is repeated successively on the pans in the other tanks.

This makes a simple construction of apparatus to be used in carrying out the improved method of freezing materials.

Having thus described my invention, I claim:

1. The method of freezing materials which consists in placing them in pans having covers the side walls of which are spaced from the side walls of said pans, positively retaining the bottoms only of said pans submerged in a liquid medium while moved through said medium, and preventing contact of said medium with said materials.

2. The method of freezing materials which consists in placing them in pans having covers the side walls of which are spaced from the side walls of said pans, submerging the bottoms only of said pans while moving in one direction in a liquid freezing medium moving in the opposite direction, and preventing contact of said medium with said materials.

3. The method of freezing materials which consists in placing them in pans open at the top and having covers the side walls of which extend downwardly and are spaced from the side walls of said pans, moving said pans through a liquid freezing medium while the bottoms of said pans are submerged in said medium, and preventing contact of said medium with said materials.

4. The method of freezing materials which consists in placing them in covered pans open at the top and having covers the side walls of which extend downwardly and are spaced from the side walls of said pans, moving them through a liquid freezing medium while the bottoms of said pans are submerged therein, subjecting the covers of said pans to sprays of said medium and preventing the admission of said medium to the interior of said pans.

5. The method of freezing materials which consists in placing them in pans having covers the top walls of which are above the side walls of said pans said side walls being spaced from the depending side walls of said covers, positively forcing said pans through a liquid freezing medium while only the bottoms of said pans are submerged in said medium, and preventing the admission of said medium to the interior of said pans.

6. The method of freezing materials which consists in placing them in covered pans having air spaces between the side walls of said pans and covers, moving them through a liquid freezing medium while only the bottoms of said pans are submerged therein, preventing the admission of said medium to the interior of said pans and subjecting the covers of said pans to sprays of said medium while said pans are being discharged from said medium.

7. The method of freezing materials which consists in placing them in covered pans having air spaces between the side walls of said pans and covers, moving them in a straight path through a liquid freezing medium while only the bottoms of said pans are submerged in said medium and confining air within said pans thereby preventing the admission of said medium thereto.

8. The method of freezing materials which consists in placing them in pans having covers adapted to be moved downwardly relatively to said pans, moving said pans through a liquid freezing medium while the bottoms only of the pans are submerged in said medium and the covers of said pans are forced downwardly onto said materials and confining air within said pans thereby preventing the admission of said medium thereto.

9. In an apparatus for freezing materials, the combination of a tank; a liquid freezing medium in said tank; supporting means submerged in said tank; imperforate pans on said supporting means containing air and movable endwise of said tank, said pans being adapted to contain the material to be frozen and covers for said pans adapted to be forced downwardly onto the material in the pans and having side walls spaced from the side walls of the pans.

10. In an apparatus for freezing materials, the combination of a tank; a liquid freezing medium in said tank; rollers submerged in said tank; pans supported on said rollers and movable endwise of said tank, said pans being adapted to contain the material to be frozen; and means for retaining said pans on said rollers.

11. In an apparatus for freezing materials, the combination of a tank; a liquid freezing medium in said tank; rollers submerged in said tank; pans supported on said rollers and movable endwise of said tank, said pans being adapted to contain the material to be frozen; and means for positively forcing said pans through said medium with their bottoms submerged therein.

12. In an apparatus for freezing materials, the combination of a tank; a liquid freezing medium in said tank; rollers submerged in said tank, the rollers at the opposite ends of said tank being disposed in inclined planes; and pans supported on said rollers and movable endwise of said tank, said pans being adapted to contain the material to be frozen.

13. In an apparatus for freezing materials, the combination of a tank; means for admitting to one end of said tank a liquid freezing medium and discharging said medium from the opposite end of the tank; imperforate air-filled pans adapted to contain the material to be frozen; covers for said pans the side walls of which are spaced from the side walls of said pans; means at said opposite end of the tank for feeding said pans into said tank; and means within the tank for submerging the bottom of said pans in said medium while moving lengthwise of said tank and forcing the covers downwardly on the materials contained within said pans.

14. In an apparatus for freezing materials, the combination of a tank; means for admitting to one end of said tank a liquid freezing medium and discharging said medium from the opposite end of the tank; imperforate air-filled pans adapted to contain the material to be frozen; covers for said pans the side walls of which are spaced from the side walls of said pans; means at said opposite end of the tank for feeding said pans into said tank; and means within the tank above and below said pans for confining their movement to a predetermined path with their bottoms submerged in said medium and causing the compression of the materials within said pans.

15. In an apparatus for freezing materials, the combination of a tank; a liquid freezing medium within said tank; covered pans adapted to contain the material to be frozen; a plurality of supporting rollers submerged in said medium; another set of rollers above and parallel to the lower set of rollers; and means for moving said pans between the two sets of rollers.

16. In an apparatus for freezing materials, the combination of a tank; a liquid freezing medium within said tank; covered pans adapted to contain the material to be frozen; a plurality of supporting rollers submerged in said medium; another set of rollers above and parallel to the lower set of rollers; means for moving said pans between the two sets of rollers; and means for subjecting the covers of said pans to sprays of said medium.

17. In an apparatus for freezing material, the combination of a tank; a liquid freezing medium within said tank; covered pans adapted to contain the material to be frozen; a plurality of supporting rollers submerged in said medium; another set of rollers above and parallel to the lower set of rollers; and a rotatable drum coacting with the tops of said pans for moving said pans between the two sets of rollers.

18. In an apparatus for freezing materials, the combination of a tank; a liquid freezing medium in said tank; means for delivering said medium to one end of said tank; a sump at the opposite end to receive the overflow from said tank; a discharge pipe from said sump; pans adapted to contain the material to be frozen; and means for moving said pans in a predetermined path through said medium with the bottoms of the pans submerged in said medium.

19. In an apparatus for freezing materials, the combination of a tank; a liquid freezing material in said tank; a frame within said tank; two sets of parallel rotatable rolls spaced apart and supported on said frame; covered pans to contain the material to be frozen; and means for moving said pans lengthwise of said tank between the two sets of rolls.

20. In an apparatus for freezing materials, the combination of a framework; a plurality of tanks supported thereby one above the other; a liquid freezing medium in said tanks; a supply pipe for admitting said medium to one end of said tanks; a discharge pipe from the opposite ends of said tanks; pans adapted to contain the material to be frozen; and means for moving said pans in predetermined paths toward the inlet ends of said tanks with the bottoms of said pans submerged in said medium.

21. Apparatus for freezing food materials, comprising a framework, a plurality of elongated tanks supported thereby in parallel relation, one above another, and a circulating system of pipes for maintaining a current of refrigerated brine flowing in said tanks, including a common supply pipe and a common discharge pipe for a plurality of said tanks.

22. Apparatus for freezing food materials, comprising an elongated tank for containing a liquid freezing medium maintained at a predetermined level therein, supporting and guiding means in said tank, a plurality of containers for the material to be frozen arranged to be partially submerged and moved from one end of the tank to the other in engagement with said medium, limited in their depth of submergence by engaging said supporting and guiding means, and means for directing a refrigerating spray upon the exposed portion of said containers.

23. Apparatus for freezing food materials, comprising an elongated tank for containing a liquid freezing medium and maintaining it at a predetermined level therein, containers for the materials to be treated adapted to be moved in engagement with said medium in partially submerged condition from one end of the tank to the other, and an overhead spray pipe for liquid freezing medium arranged to play upon the unsubmerged portions of said containers as they are advanced in the tank.

24. Apparatus for freezing food materials, comprising an elongated tank adapted to contain a liquid freezing medium, a plurality of closed containers for the food material, supporting means within said tank, so positioned as to support said containers in partial submergence in said freezing medium and adapted to permit the movement of said containers from one end of said tank to the other, and means for directing a refrigerating spray onto said containers from above.

Signed by me at 294 Washington St., Boston, Massachusetts, this 22nd day of December, 1928.

ROBERT E. KOLBE.